Sept. 8, 1942.  A. C. ANSLEY  2,295,071
PHOTOFLASH UNIT
Filed Jan. 11, 1941
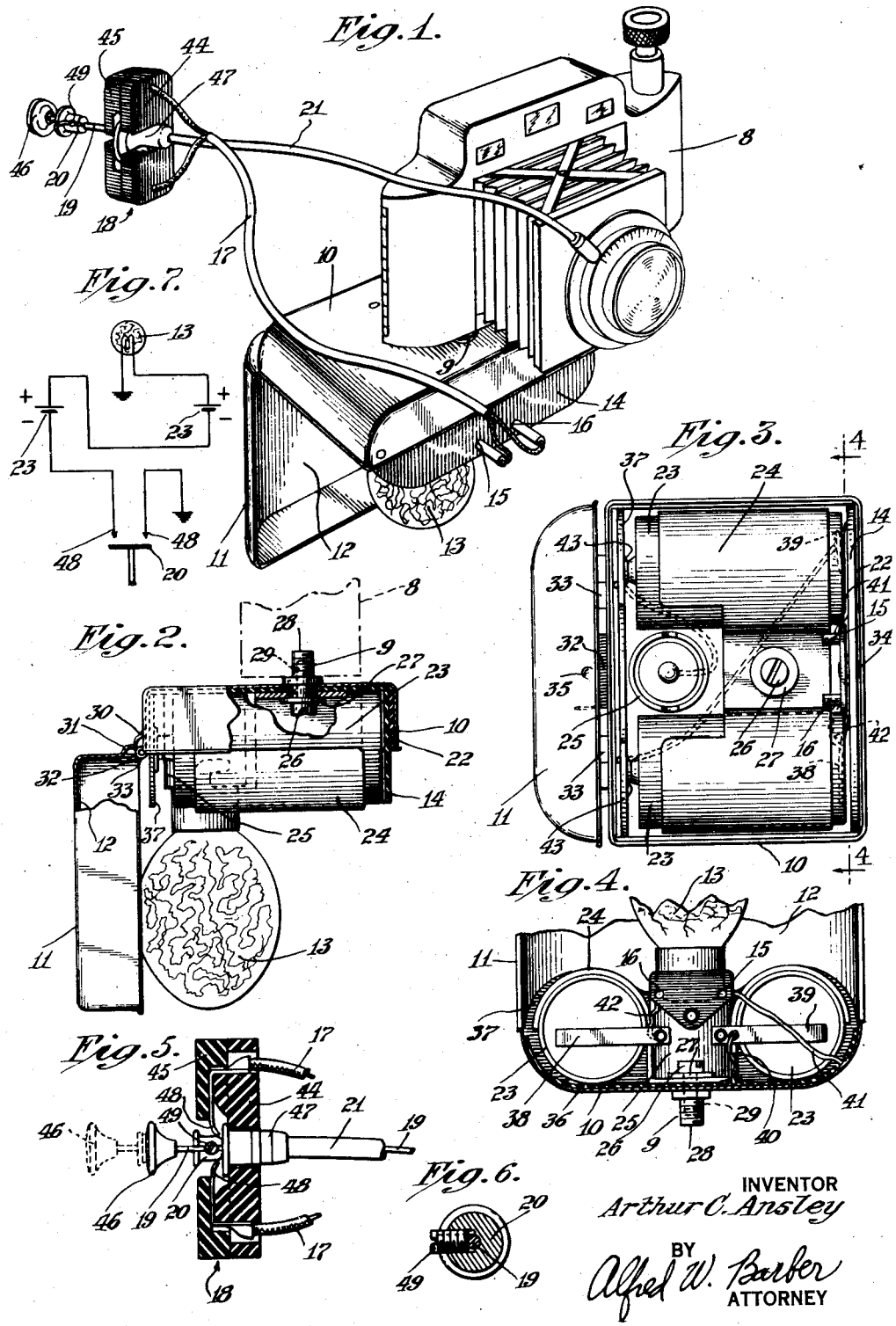
INVENTOR
Arthur C. Ansley
BY
Alfred W. Barber
ATTORNEY Patented Sept. 8, 1942

2,295,071

UNITED STATES PATENT OFFICE 2,295,071

PHOTOFLASH UNIT

Arthur C. Ansley, New York, N. Y.

Application January 11, 1941, Serial No. 374,062

3 Claims. (Cl. 67—31)

The present invention concerns camera flashlight devices and in particular devices utilizing flash-bulbs as a source of light and igniting them in synchronism with the camera shutter.

One object of the present invention is to provide a flash-light device of greatly simplified construction which is cheap to make and simple to use.

Another object is to provide a flash-light device of extremely small size whereby it may be carried in the vest pocket.

A still further object is to provide a flash-light for photographic use in which the carrying case when opened acts as a reflector for the light from the flash bulb.

Another object is to provide a flash-light for photographic use in which the synchronizing of the flash with the camera shutter is accomplished in a simple and efficient manner.

These and other objects will be apparent from the detailed description of the invention given in connection with the various figures of the drawing.

In the drawing:

Fig. 1 shows a view of one form of the invention attached to a conventional camera.

Fig. 2 shows a side view of the flash-light case, batteries and bulb.

Fig. 3 shows a top view of the portion of the invention shown in Fig. 2.

Fig. 4 shows a detail of the battery, flash lamp and external connections.

Fig. 5 shows a cross-section detail of the synchronizing units.

Fig. 6 shows a detail of the electrical contacting device.

Fig. 7 shows the electrical circuit of my invention.

In the past flash-light synchronizing devices for photography have been large and expensive. They usually consisted of a battery holder, a large reflector for the flash bulb and a more or less complicated and cumbersome synchronizing device. With the advent of flash bulbs about the size of a golf ball I have found it possible to combine the reflector and battery case in a small vest pocket sized unit. I have also invented a small simple and efficient synchronizing device which may be also placed within the battery case when not in use. One synchronizing device may be used with all cameras capable of being operated with a cable release. There are available cable releases for all cameras with a plunger of uniform size to fit my synchronizer. The battery case is made of two similar parts hinged at the back. The cover of this unit is polished and when the case is opened, it acts as a reflector.

Fig. 1 shows a conventional camera 8 to the tripod socket 9 of which is attached the bottom part 10 of the battery case of my flash-light synchronizer. The cover 11 of the case is shown open. In this position the polished inside surface 12 acts as a reflector for the flash bulb 13. On the opposite side of the battery case is mounted an insulating strip 14 on which is mounted two electrical connectors 15 and 16. A two wire cable 17 leads to the synchronizing unit 18. The cable release 21 of the camera is placed in a slot in synchronizing unit 18 and an electrical contactor 20 is clamped to plunger 19 of the cable release. When plunger 19 is depressed to operate the shutter of the camera contactor 20 closes an electrical circuit in synchronizing unit 18 setting off flash bulb 13. Contactor 20 may be moved along plunger 19 until the flash synchronizes properly with the opening of the camera shutter.

Fig. 2 shows in more detail the battery case 10—11. The inside of the bottom 10 of the battery case is lined with insulating material 22. The insulating piece 14 carrying the electrical connectors is shown. Batteries 23 are held in place by means of a formed clamp 24. Socket 25 for flash-lamp 13 is mounted in the space between the batteries. In order to attach the battery case to the tripod socket 9 of camera 8 a threaded stud 28 is provided. This stud 28 has an internally threaded hole 29 into which screws the locking screw 26. Screw 26 passes through the battery clamp 24 thus holding the batteries in place. Between the head of screw 26 and case 10 is located a friction washer 27 so that when screw 26 is tightened up the device is held together firmly but the case may be turned from side to side to align it properly with the lens of the camera. On the rear edge of the case bottom 10 is provided a stop piece 30 and on top piece 11 a similar stop piece 31. When case 10—11 is opened a spring 32 coiled around hinge 33 holds stop 31 against stop 30 and cover 11 assumes a position perpendicular to bottom 10 and is thus in a position to efficiently reflect light from flash lamp 13.

Fig. 3 shows a top view of the battery case shown in Fig. 2. Fig. 3 shows in particular hinge 33 with spring 32 which holds cover 11 in correct position when the device is in use. When cover 11 is closed against base 10 an indentation 35 in cover 11 snaps into a hole 34 in insulation strip 14 holding the case shut. The positions of batteries 23 and battery clamp 24 relative to socket

25 is clearly shown. Contacts 15 and 16 are also shown. These contacts may conveniently be phone tip jacks into which the cable is plugged when the device is to be operated. Screw 26 and washer 27 for holding clamp 24 in place is also shown.

Fig. 4 shows a section of Fig. 3 along line 4—4. Fig. 4 shows more clearly the battery connections. Batteries 23 are connected with the flash bulb 13 and connectors 15 and 16 by means of various wires and battery connectors including battery connectors 38 and 39 and wires 40, 41 and 42. The other ends of batteries 23 are in contact with battery connectors 43 (Fig. 3) mounted on insulating strip 37. Fig. 4 also shows base 10, cover 11, flash bulb socket 25, screw 26 and screw 26—29.

Fig. 5 shows a section through synchronizer 18. Synchronizer 18 is made up of two pieces of insulating material 44 and 45. Insulating piece 44 has a slot into which the body 47 of the camera cable release slips. The outer edges of piece 45 are fitted to hold body 47 in place (Fig. 1.). Clamped between insulating pieces 44 and 45 are two electrical contacts 48 made of suitable spring material such as phosphor-bronze. These contacts 48 are connected to the ends of wires 17 leading to the battery and flash bulb unit. Shorting contacts 48 together connects batteries 23 across flash bulb 13 thereby setting off the flash. The shorting is accomplished by means of contactor 20 carried by plunger 19 of the cable release. When button 46 of the cable release is pushed plunger 19 carrying contactor 20 moves toward body 47 until a point is reached at which contacts 48 are shorted igniting flash bulb 13. Further movement of plunger 19 trips the camera shutter and finally contactor 20 reaches body 47 and acts as a stop. The position of contactor 20 on plunger 19 may be adjusted to produce the desired time relation between ignition of bulb 13 and opening of the camera shutter. Most flash bulbs reach maximum brilliance about 0.02 second after ignition at which time the shutter should be opened. Fig. 5 shows button 46 in its released position in dotted lines.

Fig. 6 shows a cross-section of contactor 20. It shows the central hole fitting around plunger 19 and how set-screw 49 fits in the slot which allows contactor to be fitted to plunger 19 and adjusted along it. When the correct position is found, set screw 49 is tightened to lock contactor 20 on plunger 19 at this point.

Fig. 7 shows the equivalent electrical circuit of the flash synchronizer. It shows how contactor 20 shorts contacts 48 connecting batteries 23 in series across flash bulb 13.

While only one embodiment of the present invention has been shown and described many modifications are possible as will be evident to those skilled in the art and within the spirit and scope of the invention as set forth in the appended claims.

What is claimed, is:

1. In a flash-light device, the combination of a battery case including two major portions, one of said portions containing a battery compartment and a flash-bulb socket, means to connect the batteries to said bulb, and a stud mounted with its axis parallel to the axis of said socket for attaching said device to a camera and the other of said portions including a reflector which may be opened to a position to reflect the light emitted by said bulb, wherein said two portions are hinged together to provide a compact case for ready transportation.

2. In a flash-light device, the combination of a base unit and a cover wherein said base unit carries a socket for a flash-bulb, a battery compartment for batteries to ignite said bulb, a stud for attaching said unit to a camera tripod socket mounted on said compartment, and electrical contacts for an external switch connection, and said cover comprises a reflector for said bulb and means for holding the surface of said reflector in predetermined relation to said bulb for efficient reflection of light therefrom.

3. In a photoflash device, the combination of, a case including two major parts, one of said parts comprising a concave reflector and the other of said parts comprising a battery compartment, means for holding said parts substantially at right angles when in operating position, a flash-bulb socket attached to said battery compartment for holding a flash-bulb in front of said reflector, means for holding a pair of batteries with their axes perpendicular to the axis of said socket, and a stud for attaching said device to a camera the axis of said stud being parallel to the axis of said socket, said stud being mounted on said battery compartment.

ARTHUR C. ANSLEY.